United States Patent
Liu et al.

(10) Patent No.: US 10,165,219 B2
(45) Date of Patent: Dec. 25, 2018

(54) TOUCH DISPLAY MODULE AND POSITIONER THEREOF

(71) Applicant: WISTRON CORP., New Taipei (TW)

(72) Inventors: You-Xin Liu, New Taipei (TW);
Chia-Chang Hou, New Taipei (TW);
Po-Liang Huang, New Taipei (TW);
Chia-Jui Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 728 days.

(21) Appl. No.: 13/924,414

(22) Filed: Jun. 21, 2013

(65) Prior Publication Data
US 2013/0342767 A1 Dec. 26, 2013

(30) Foreign Application Priority Data

Jun. 26, 2012 (TW) .............................. 101212224 U (51) Int. Cl.
*G06F 3/00* (2006.01)
*G06F 3/042* (2006.01)
*H04N 5/64* (2006.01)

(52) U.S. Cl.
CPC ............. *H04N 5/64* (2013.01); *G06F 3/0421* (2013.01)

(58) Field of Classification Search
USPC ........................................................ 348/836
See application file for complete search history.

(56) References Cited

U.S. PATENT DOCUMENTS

| | | | | |
|---|---|---|---|---|
| 4,710,760 A | * | 12/1987 | Kasday | G06F 3/0428 178/18.09 |
| 6,828,959 B2 | * | 12/2004 | Takekawa | G06F 3/0421 178/18.01 |
| 7,751,671 B1 | * | 7/2010 | Newton | G02B 6/0091 345/173 |
| 8,780,087 B2 | * | 7/2014 | Kim | G06F 3/0416 345/175 |
| 9,063,616 B2 | * | 6/2015 | Yu | G06F 3/0421 |
| 2002/0050985 A1 | * | 5/2002 | Takekawa | G06F 3/0421 345/173 |
| 2004/0012573 A1 | * | 1/2004 | Morrison | G06F 3/0428 345/173 |
| 2005/0237317 A1 | * | 10/2005 | Cok | G06F 3/0421 345/207 |
| 2008/0204437 A1 | * | 8/2008 | Jensen | G01J 1/02 345/207 |
| 2009/0213093 A1 | * | 8/2009 | Bridger | G06F 3/0421 345/175 |

(Continued)

FOREIGN PATENT DOCUMENTS

TW M414615 U1 10/2011

*Primary Examiner* — Jessica M Prince
*Assistant Examiner* — Patrick E Demosky (57) ABSTRACT

A positioner is provided for positioning a major optical sensing unit and an auxiliary optical sensing unit on a first screen. The positioner includes a body, and a first mounting hole and a first auxiliary mounting hole are formed on the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line.

13 Claims, 6 Drawing Sheets

(56) References Cited

U.S. PATENT DOCUMENTS

| | | | |
|---|---|---|---|
| 2009/0213094 A1* | 8/2009 | Bridger | G06F 3/0421 345/175 |
| 2009/0278795 A1* | 11/2009 | Hansen | G06F 3/0421 345/156 |
| 2010/0315383 A1* | 12/2010 | Chang | G06F 3/0428 345/175 |
| 2011/0032216 A1* | 2/2011 | Hos | G06F 3/042 345/175 |
| 2011/0176082 A1* | 7/2011 | Allard | G06F 3/041 349/58 |
| 2011/0267314 A1* | 11/2011 | Huang | G06F 3/0428 345/175 |
| 2011/0279902 A1* | 11/2011 | Freeman | G06F 1/1603 359/613 |
| 2012/0092647 A1* | 4/2012 | Lim | G01J 1/0271 356/51 |
| 2012/0098746 A1* | 4/2012 | Ogawa | G06F 3/0428 345/158 |
| 2012/0162135 A1* | 6/2012 | Lee | G06F 3/0428 345/175 |
| 2012/0176345 A1* | 7/2012 | Ye | G06F 3/041 345/175 |
| 2012/0306816 A1* | 12/2012 | Bridger | G06F 3/0428 345/175 |
| 2012/0306820 A1* | 12/2012 | Yu | G06F 3/0421 345/175 |
| 2013/0044081 A1* | 2/2013 | Wu | G06F 3/042 345/175 |
| 2013/0057517 A1* | 3/2013 | Kao | G06F 3/0416 345/175 |
| 2013/0100084 A1* | 4/2013 | Son | G06F 3/0428 345/175 |
| 2013/0335334 A1* | 12/2013 | Zhu | G06F 3/042 345/173 |
| 2013/0342767 A1* | 12/2013 | Liu | H04N 5/64 348/836 |
| 2014/0098062 A1* | 4/2014 | Lin | G06F 3/042 345/175 |
| 2014/0132542 A1* | 5/2014 | Lipman | G06F 3/0488 345/173 |

* cited by examiner

TOUCH DISPLAY MODULE AND POSITIONER THEREOF

CROSS REFERENCE TO RELATED APPLICATIONS

This Application claims priority of Taiwan Patent Application No. 101212224, filed on Jun. 26, 2012, the entirety of which is incorporated by reference herein.

BACKGROUND

The present disclosure relates to a positioner, and in particular, relates to a positioner related to a touch display module.

DESCRIPTION OF THE RELATED ART

Optical touch technology is utilized in large sized TVs, wherein optical sensing units are mounted on a TV screen, and a pair of optical sensing units (each including an image sensor and light source) detects the touch position of a user. Accurate positioning of the optical sensing units on the TV screen is very critical. The horizontal position of the optical sensing units is conventionally defined by the size the of the TV screen. Thus, the pointing directions of the optical sensing units are adjusted manually according to the dimensions and position of the display area of the TV screen to define the touch area. The mounting process of the optical sensing units is inconvenient and time consuming.

BRIEF SUMMARY OF THE DISCLOSURE

A positioner is provided for positioning a major optical sensing unit and an auxiliary optical sensing unit on a first screen. The positioner includes a body, and a first mounting hole and a first auxiliary mounting hole are formed on the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line.

Utilizing the positioner of the embodiment of the disclosure, the major optical sensing unit and the auxiliary optical sensing unit are positioned by the positioner on the screen, and the mounting process of the major optical sensing unit and the auxiliary optical sensing unit is accomplished by removing the positioner. The major optical sensing unit is disposed toward the first pointing direction, and the auxiliary optical sensing unit is disposed toward the first auxiliary pointing direction. Manual direction adjustment is not required, and mounting time is reduced.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

Figure 1:
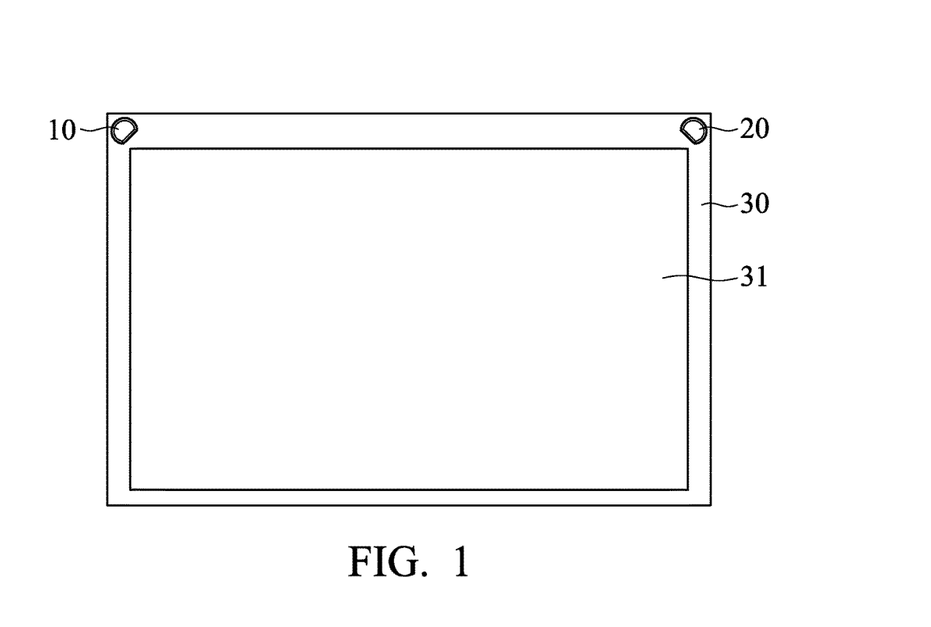
FIG. 1 shows the touch display module of the embodiment of the disclosure.

FIG. 1 shows a touch display module 1 of an embodiment of the disclosure which is adapted to be assembled by a positioner of the embodiment of the disclosure. The touch display module 1 comprises a major optical sensing unit 10, an auxiliary optical sensing unit 20 and a screen 30. The screen 30 comprises a display area 31. The major optical sensing unit 10 is disposed on the screen 30 toward the display area 31. The auxiliary optical sensing unit 20 is disposed on the screen 30 toward the display area 31.

Figure 2:
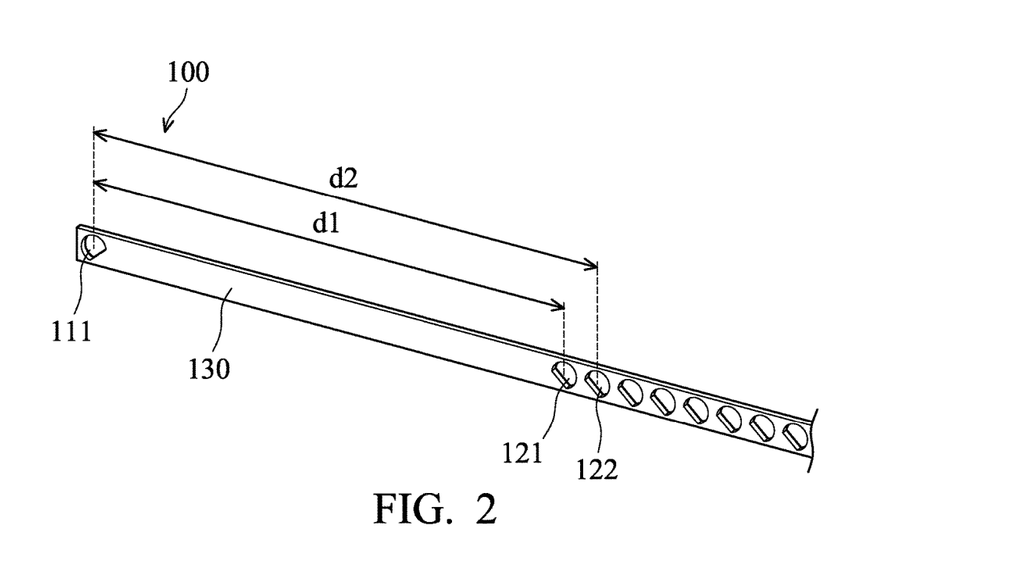
FIG. 2 shows the positioner of the first embodiment of the disclosure.
Figure 3:
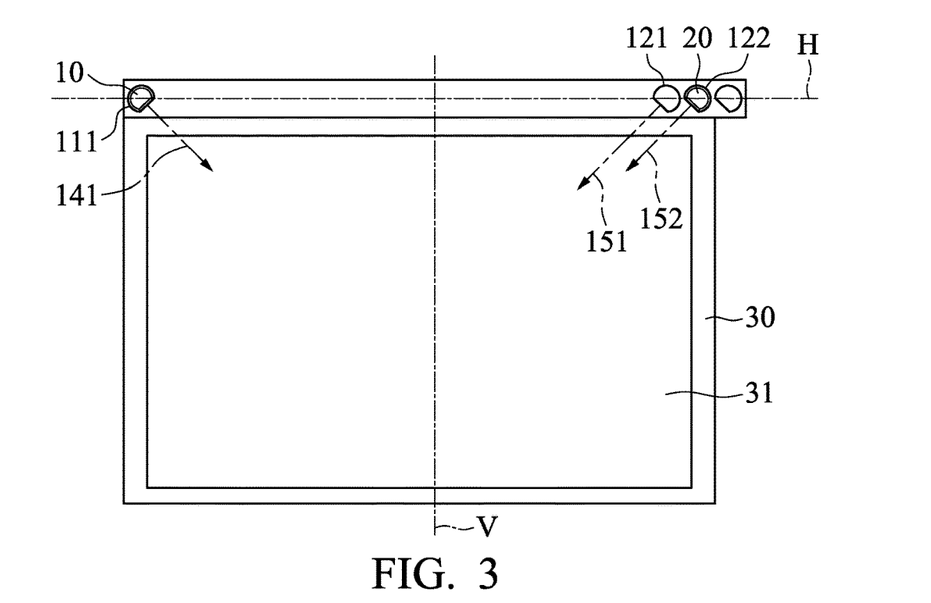
FIG. 3 shows the optical sensing units mounted onto the screen via the positioner of the first embodiment of the disclosure.

FIG. 2 shows the positioner 100 of a first embodiment of the disclosure. The positioner 100 comprises a body 130, wherein a first mounting hole 111, a first auxiliary mounting hole 121 and a second auxiliary mounting hole 122 are formed on the body 130. With reference to FIGS. 2 and 3, the first mounting hole 111, the first auxiliary mounting hole 121 and the second auxiliary mounting hole 122 are aligned on a horizontal line H. A first screen dimension distance d1 is formed between the first mounting hole 111 and the first auxiliary mounting hole 121. A second screen dimension distance d2 is formed between the first mounting hole 111 and the second auxiliary mounting hole 122. The first mounting hole 111 has a first pointing direction 141. The first auxiliary mounting hole 121 has a first auxiliary pointing direction 151. The first pointing direction 141 is symmetrical to the first auxiliary pointing direction 151 relative to a vertical line V. The major optical sensing unit 10 is positioned on the screen 30 via the first mounting hole 111. The auxiliary optical sensing unit 20 is positioned on the screen 30 selectively via the first auxiliary mounting hole 121 or the second auxiliary mounting hole 122 according to the dimensions of the screen 30.

Figure 4A:
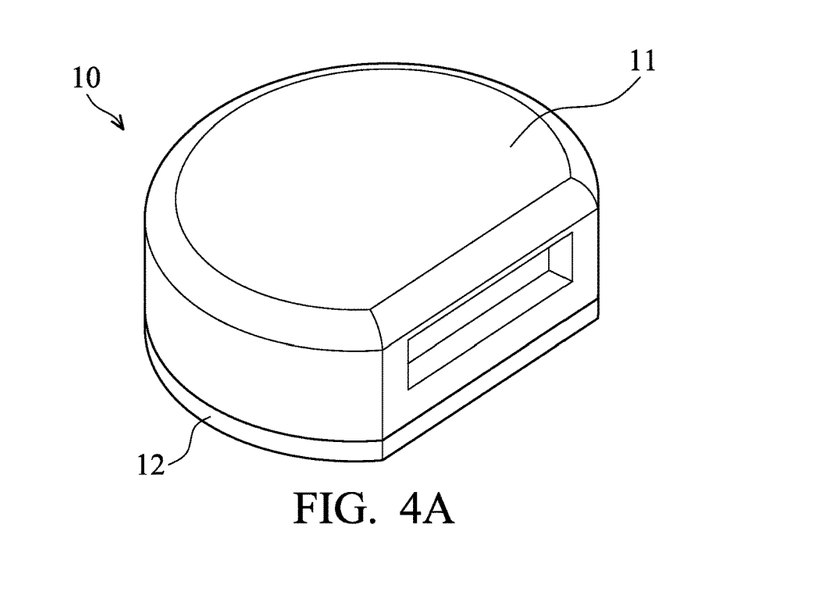
FIG. 4A shows detailed structure of the optical sensing units of the embodiment of the disclosure.
Figure 4B:
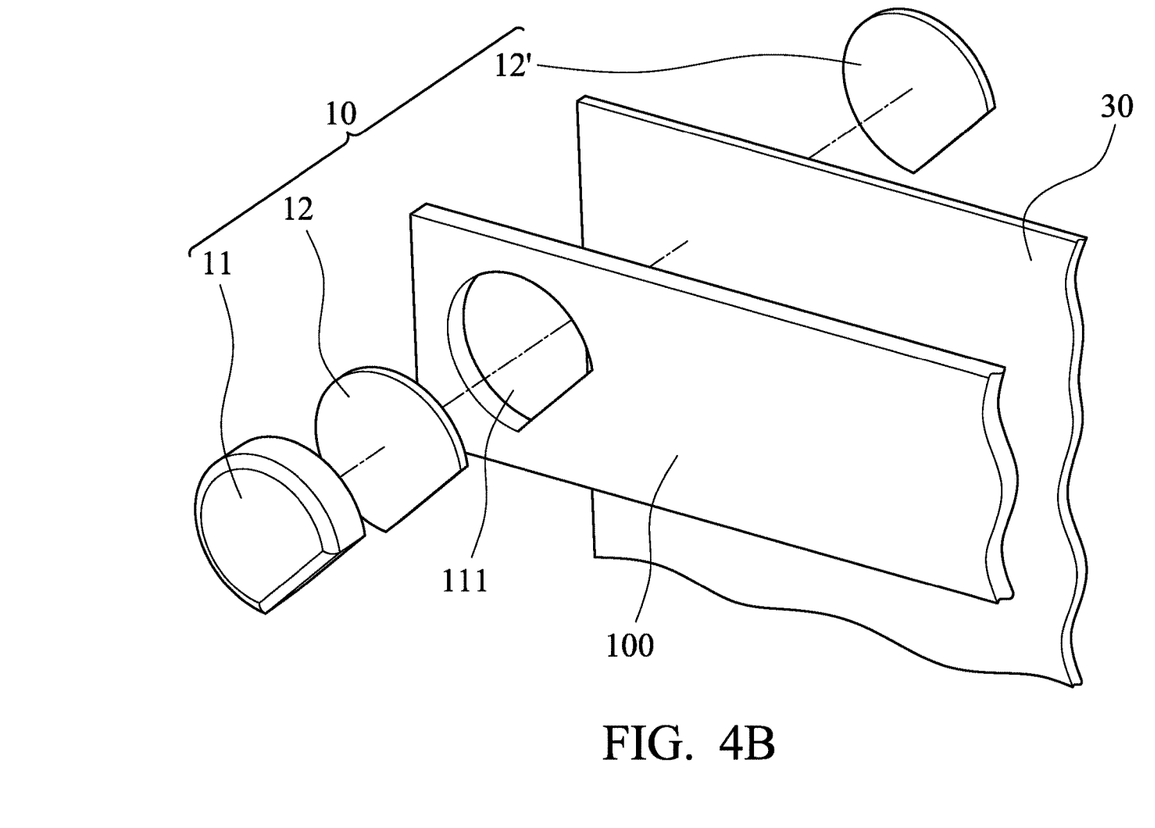
FIG. 4B shows the optical sensing unit of the embodiment of the disclosure attached onto the screen.

With reference to FIG. 4A, in this embodiment, the major optical sensing unit 10 comprises a major unit body 11 and a major magnet 12. The auxiliary optical sensing unit 20 comprises an auxiliary unit body and an auxiliary magnet. The structure of the auxiliary optical sensing unit 20 is similar to the major optical sensing unit 10. Thus, detailed description of the auxiliary optical sensing unit 20 is therefore omitted. The major magnet 12 is disposed on the major unit body 11, and the major unit body 11 is attached on the screen 30 via the major magnet 12. Similarly, the auxiliary magnet is disposed on the auxiliary unit body, and the auxiliary unit body is attached on the screen via the auxiliary magnet. With reference to FIG. 4B, in one embodiment, the major optical sensing unit 10 further comprises a secondary major magnet 12'. The major magnet 12 and the secondary major magnet 12' hold up the screen 30 to fix the major optical sensing unit 10 on the screen 30.

The first pointing direction 141 and the first auxiliary pointing direction 151 are predetermined directions which provide optimized sensing effect. The major optical sensing unit 10 and the auxiliary optical sensing unit 20 are attached on the screen 30 by magnets. Therefore, after the major optical sensing unit 10 and the auxiliary optical sensing unit 20 are positioned by the positioner 100 on the screen 30, the mounting process of the major optical sensing unit 10 and the auxiliary optical sensing unit 20 is accomplished by removing the positioner 100. The major optical sensing unit 10 is disposed toward the first pointing direction 141, and the auxiliary optical sensing unit 20 is disposed toward the first auxiliary pointing direction 151. Manual direction adjustment is not required, and mounting time is reduced.

In one embodiment, the second auxiliary mounting hole 122 has a second auxiliary pointing direction 152. The second auxiliary pointing direction 152 is parallel to the first auxiliary pointing direction 151. An included angle between the first pointing direction 141 and the vertical line V is 45°, and an included angle between the first auxiliary pointing direction 151 and the vertical line is 45°.

Figure 5A:
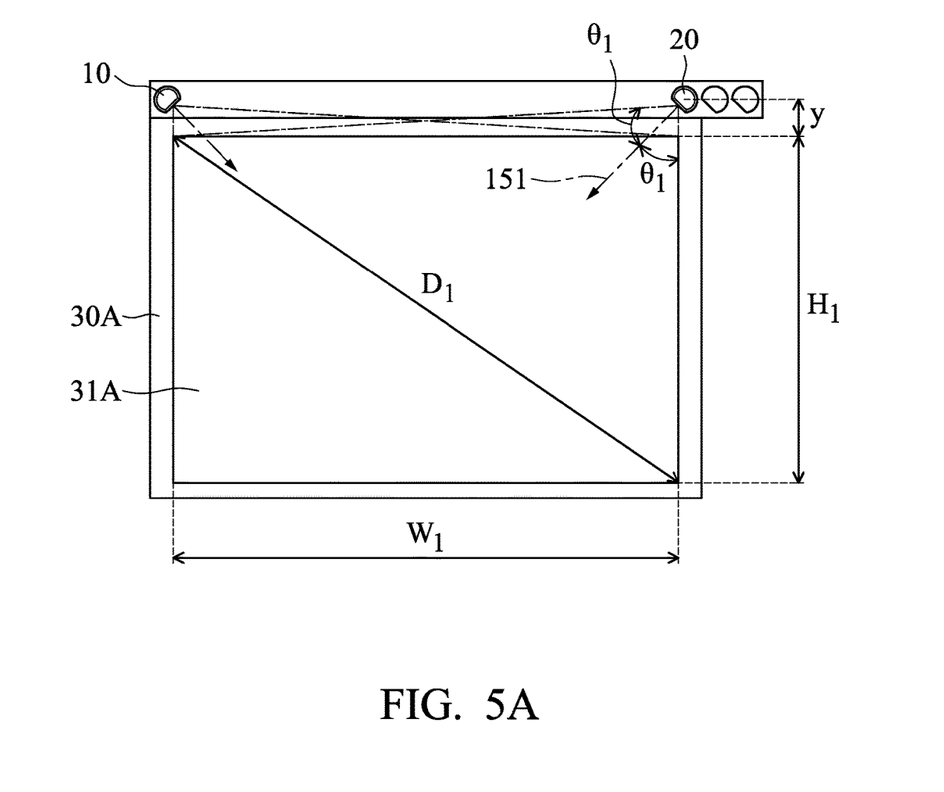
FIG. 5A shows the first pointing direction when the optical sensing units are mounted onto the first screen.

In another embodiment, the first auxiliary pointing direction and the second auxiliary pointing direction are varied with the dimensions of the screens (for example, first screen and second screen). With reference to FIG. 5A, a first auxiliary included angle $\theta_1$ is formed between the first auxiliary pointing direction 151 and the vertical line V, and a formula thereof is as follows:

$$\theta_1 = \frac{1}{2} \times \cos^{-1}\left(\frac{(H_1 + y)^2 + W_1^2 - D_1^2}{2 \times W_1 \times (H_1 + y)}\right) \quad (A)$$

wherein, $H_1$ is a height of a first display area 31A of the first screen 30A, $W_1$ is a width of the first display area 31A of the first screen 30A, $D_1$ is a diagonal length of the first display area 31A of the first screen 30A, and y is a distance between the first mounting hole and the first display area 31A of the first screen 30A.

Figure 5B:
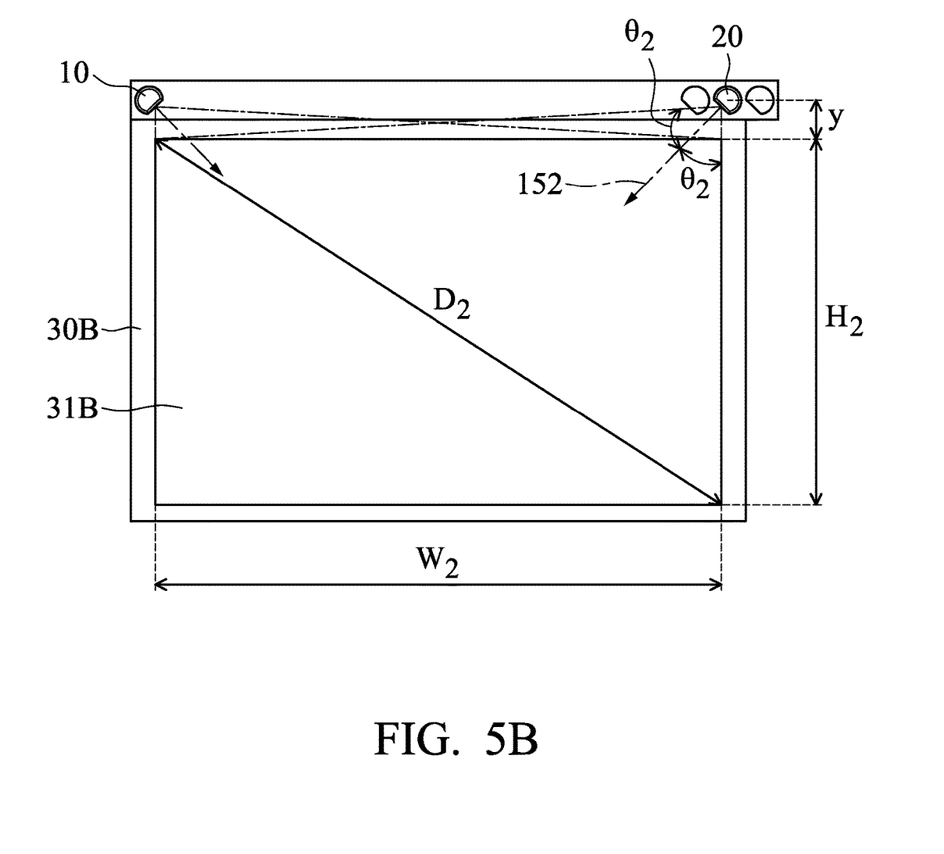
FIG. 5B shows the second pointing direction when the optical sensing units are mounted onto the second screen.

With reference to FIG. 5B, a second auxiliary included angle $\theta_2$ is formed between the second auxiliary pointing direction 152 and the vertical line V, and a formula thereof is as follows:

$$\theta_2 = \frac{1}{2} \times \cos^{-1}\left(\frac{(H_2 + y)^2 + W_2^2 - D_2^2}{2 \times W_2 \times (H_2 + y)}\right) \quad (B)$$

wherein, $H_2$ is a height of a second display area 31B of the second screen 30B, $W_2$ is a width of the second display area 31B of the second screen 30B, $D_2$ is a diagonal length of the second display area 31B of the second screen 30B, and y is a distance between the second mounting hole and the second display area 31B of the second screen 30B.

In this embodiment, an included angle between the first pointing direction 141 and the vertical line V can be 45°.

The first embodiment of the disclosure shows a positioner with one single mounting hole and a plurality of auxiliary mounting holes.

Figure 6:
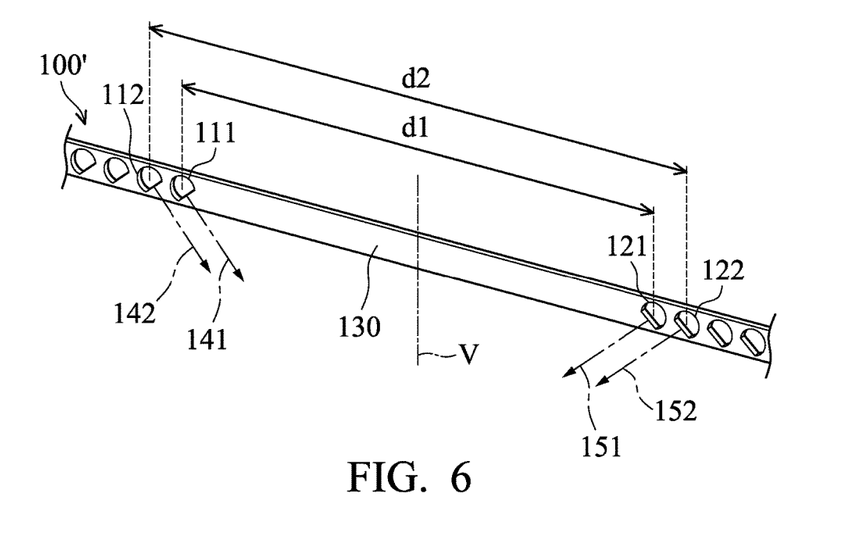
FIG. 6 shows the positioner of the second embodiment of the disclosure.

FIG. 6 shows a positioner 100' of a second embodiment of the disclosure, which differs from the first embodiment in that the positioner of the second embodiment of the disclosure has a plurality of mounting hole and a plurality of auxiliary mounting holes. Compared to the positioner 100 of the first embodiment, the positioner 100' of the second embodiment further comprises a second mounting hole 112 formed on the body 110. A first screen dimension distance d1 is formed between the first mounting hole 111 and the first auxiliary mounting hole 121. A second screen dimension distance d2 is formed between the second mounting hole 112 and the second auxiliary mounting hole 122.

The first mounting hole 111 has a first pointing direction 141. The first auxiliary mounting hole 121 has a first auxiliary pointing direction 151. The second mounting hole 112 has a second pointing direction 142. The second auxiliary mounting hole 122 has a second auxiliary pointing direction 152. The first pointing direction 141 is symmetrical to the first auxiliary pointing direction 151 relative to a vertical line V. The second pointing direction 142 is symmetrical to the second auxiliary pointing direction 152 relative to the vertical line V. Similar to the first embodiment, a first auxiliary included angle $\theta_1$ is formed between the first auxiliary pointing direction 151 and the vertical line V, having the formula (A) above. A second auxiliary included angle $\theta_2$ is formed between the second auxiliary pointing direction 152 and the vertical line V, having the formula (B) above.

Figure 7:
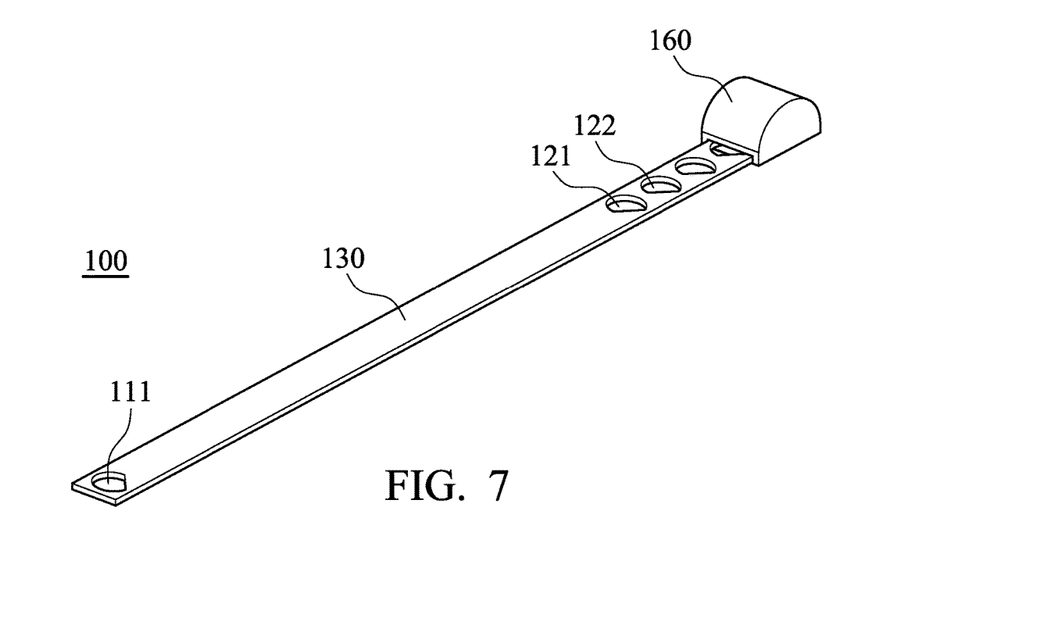
FIG. 7 shows the tape type positioner of the embodiment of the disclosure.

With reference to FIG. 7, the positioner 100 can be a tape type positioner, wherein the body 130 can be winded into a housing 160. Additionally, a size label can be formed aside the mounting holes and the auxiliary mounting holes to assist in the mounting process. For example, 15" can be labeled aside the first auxiliary mounting hole, and 16" can be labeled aside the second auxiliary mounting hole.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A positioner, for positioning a major optical sensing unit and an auxiliary optical sensing unit on a first screen, comprising:
   a body, wherein a first mounting hole and a first auxiliary mounting hole are formed on the body, wherein the first mounting hole and the first auxiliary mounting hole are each apertures passing through the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line,
   wherein, during positioning, the major optical sensing unit passes through the first mounting hole, the auxiliary optical sensing unit passes through the first auxiliary mounting hole, the major optical sensing unit is positioned toward the first pointing direction by the first mounting hole, and the auxiliary optical sensing unit is positioned toward the first auxiliary pointing direction by the first auxiliary mounting hole, wherein the first pointing direction differs from the first auxiliary pointing direction, and wherein the positioner detachably contacts the major optical sensing unit and the auxiliary optical sensing unit during positioning, wherein after the major optical sensing unit and the auxiliary optical sensing unit are fastened to the first screen for sensing, the positioner is detached from the major optical sensing unit and the auxiliary optical sensing unit.

2. The positioner as claimed in claim 1, wherein an included angle between the first pointing direction and the vertical line is 45°, and an included angle between the first auxiliary pointing direction and the vertical line is 45°.

3. The positioner as claimed in claim 1, wherein a second auxiliary mounting hole is formed on the body, and the first mounting hole, the first auxiliary mounting hole and the second auxiliary mounting hole are aligned on the horizontal line, and the second auxiliary mounting hole has a second auxiliary pointing direction, such that when the major optical sensing unit and the auxiliary optical sensing unit are disposed on a second screen, the auxiliary optical sensing unit is positioned on the second screen via the second auxiliary mounting hole, wherein after the major optical sensing unit and the auxiliary optical sensing unit are fastened to the second screen, the positioner is detached from the major optical sensing unit and the auxiliary optical sensing unit.

4. The positioner as claimed in claim 3, wherein the first auxiliary pointing direction is parallel to the second auxiliary pointing direction.

5. The positioner as claimed in claim 3, wherein a first auxiliary included angle $\theta_1$ is formed between the first auxiliary pointing direction and the vertical line, and a formula thereof is as follows:

$$\theta_1 = \frac{1}{2} \times \cos^{-1}\left(\frac{(H_1+y)^2 + W_1^2 - D_1^2}{2 \times W_1 \times (H_1+y)}\right)$$

wherein, $H_1$ is a height of a first display area of the first screen, $W_1$ is a width of the first display area of the first screen, $D_1$ is a diagonal length of the first display area of the first screen, and y is a distance between the first mounting hole and the first display area of the first screen.

6. The positioner as claimed in claim 5, wherein an included angle between the first auxiliary pointing direction and the vertical line is 45°.

7. The positioner as claimed in claim 5, wherein a second auxiliary included angle $\theta_2$ is formed between the second auxiliary pointing direction and the vertical line, and a formula thereof is as follows:

$$\theta_2 = \frac{1}{2} \times \cos^{-1}\left(\frac{(H_2+y)^2 + W_2^2 - D_2^2}{2 \times W_2 \times (H_2+y)}\right)$$

wherein, $H_2$ is a height of a second display area of the second screen, $W_2$ is a width of the second display area of the second screen, $D_2$ is a diagonal length of the second display area of the second screen, and y is a distance between the second mounting hole and the second display area of the second screen.

8. A positioner, for positioning a major optical sensing unit and an auxiliary optical sensing unit on a first screen, comprising:

a body, and a first mounting hole and a first auxiliary mounting hole are formed on the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line, wherein, a second mounting hole and a second auxiliary mounting hole are formed on the body, wherein the first mounting hole, the first auxiliary mounting hole, the second mounting hole and the second auxiliary mounting hole are each apertures passing through the body, and the first mounting hole, the first auxiliary mounting hole, the second mounting hole and the second auxiliary mounting hole are aligned on the horizontal line, and the second mounting hole has a second pointing direction, the second auxiliary mounting hole has a second auxiliary pointing direction, and the second pointing direction is symmetrical to the second auxiliary pointing direction relative to the vertical line, such that when the major optical sensing unit and the auxiliary optical sensing unit are disposed on a second screen, the major optical sensing unit is positioned on the second screen via the second mounting hole, and the auxiliary optical sensing unit is positioned on the second screen via the second auxiliary mounting hole, wherein, during positioning, the major optical sensing unit passes through the first mounting hole, the auxiliary optical sensing unit passes through the first auxiliary mounting hole, the major optical sensing unit is positioned toward the first pointing direction by the first mounting hole, and the auxiliary optical sensing unit is positioned toward the first auxiliary pointing direction by the first auxiliary mounting hole, wherein the first pointing direction differs from the first auxiliary pointing direction, and wherein the positioner detachably contacts the major optical sensing unit and the auxiliary optical sensing unit during positioning, wherein after the major optical sensing unit and the auxiliary optical sensing unit are fastened to the first screen for sensing, the positioner is detached from the major optical sensing unit and the auxiliary optical sensing unit, wherein after the major optical sensing unit and the auxiliary optical sensing unit are fastened to the second screen, the positioner is detached from the major optical sensing unit and the auxiliary optical sensing unit.

9. The positioner as claimed in claim 8, wherein a first auxiliary included angle $\theta_1$ is formed between the first auxiliary pointing direction and the vertical line, and a formula thereof is as follows:

$$\theta_1 = \frac{1}{2} \times \cos^{-1}\left(\frac{(H_1+y)^2 + W_1^2 - D_1^2}{2 \times W_1 \times (H_1+y)}\right)$$

wherein, $H_1$ is a height of a first display area of the first screen, $W_1$ is a width of the first display area of the first screen, $D_1$ is a diagonal length of the first display area of the first screen, and y is a distance between the first mounting hole and the first display area of the first screen.

10. The positioner as claimed in claim 9, wherein a second auxiliary included angle $\theta_2$ is formed between the second auxiliary pointing direction and the vertical line, and a formula thereof is as follows:

$$\theta_2 = \frac{1}{2} \times \cos^{-1}\left(\frac{(H_2 + y)^2 + W_2^2 - D_2^2}{2 \times W_2 \times (H_2 + y)}\right)$$

wherein, $H_2$ is a height of a second display area of the second screen, $W_2$ is a width of the second display area of the second screen, $D_2$ is a diagonal length of the second display area of the second screen, and y is a distance between the second mounting hole and the second display area of the second screen.

11. A touch display module, adapted to be assembled by a positioner, comprising:
a screen, comprising a display area;
a major optical sensing unit, disposed on the screen toward the display area; and
an auxiliary optical sensing unit, disposed on the screen toward the display area,
wherein the positioner comprises a body, and a first mounting hole and a first auxiliary mounting hole are formed on the body, wherein the first mounting hole and the first auxiliary mounting hole are each apertures passing through the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line,
wherein the major optical sensing unit is positioned on the screen via the first mounting hole, and the auxiliary optical sensing unit is positioned on the screen via the first auxiliary mounting hole,
wherein, during positioning, the major optical sensing unit passes through the first mounting hole, the auxiliary optical sensing unit passes through the first auxiliary mounting hole, the major optical sensing unit is positioned toward the first pointing direction by the first mounting hole, and the auxiliary optical sensing unit is positioned toward the first auxiliary pointing direction by the first auxiliary mounting hole, wherein the first pointing direction differs from the first auxiliary pointing direction, and
wherein the positioner detachably contacts the major optical sensing unit and the auxiliary optical sensing unit during positioning,
wherein after the major optical sensing unit and the auxiliary optical sensing unit are fastened to the screen for sensing, the positioner is detached from the major optical sensing unit and the auxiliary optical sensing unit.

12. The touch display module as claimed in claim 11, wherein the major optical sensing unit comprises a major unit body and a major magnet, the auxiliary optical sensing unit comprises an auxiliary unit body and an auxiliary magnet, the major magnet is disposed on the major unit body, the major unit body is attached on the screen via the major magnet, the auxiliary magnet is disposed on the auxiliary unit body, and the auxiliary unit body is attached on the screen via the auxiliary magnet.

13. A touch display module, adapted to be assembled by a positioner, comprising:
a screen, comprising a display area;
a major optical sensing unit, disposed on the screen toward the display area; and
an auxiliary optical sensing unit, disposed on the screen toward the display area,
wherein the positioner comprises a body, and a first mounting hole and a first auxiliary mounting hole are formed on the body, wherein the first mounting hole and the first auxiliary mounting hole are each apertures passing through the body, and the first mounting hole and the first auxiliary mounting hole are aligned on a horizontal line, and the first mounting hole has a first pointing direction, the first auxiliary mounting hole has a first auxiliary pointing direction, and the first pointing direction is symmetrical to the first auxiliary pointing direction relative to a vertical line,
wherein the major optical sensing unit is positioned on the screen via the first mounting hole, and the auxiliary optical sensing unit is positioned on the screen via the first auxiliary mounting hole,
wherein the major optical sensing unit comprises a major unit body and a major magnet, the auxiliary optical sensing unit comprises an auxiliary unit body and an auxiliary magnet, the major magnet is disposed on the major unit body, the major unit body is attached on the screen via the major magnet, the auxiliary magnet is disposed on the auxiliary unit body, and the auxiliary unit body is attached on the screen via the auxiliary magnet,
wherein, during positioning, the major optical sensing unit passes through the first mounting hole, the auxiliary optical sensing unit passes through the first auxiliary mounting hole, the major optical sensing unit is positioned toward the first pointing direction by the first mounting hole, and the auxiliary optical sensing unit is positioned toward the first auxiliary pointing direction by the first auxiliary mounting hole, wherein the first pointing direction differs from the first auxiliary pointing direction, and
wherein the positioner detachably contacts the major optical sensing unit and the auxiliary optical sensing unit during positioning,
wherein after the major optical sensing unit and the auxiliary optical sensing unit are fastened to the screen for sensing, the positioner is detached from the major optical sensing unit and the auxiliary optical sensing unit.

* * * * *